(12) United States Patent
Smith

(10) Patent No.: US 9,413,684 B2
(45) Date of Patent: *Aug. 9, 2016

(54) PROVISIONING LEGACY SYSTEMS NETWORK ARCHITECTURE RESOURCE COMMUNICATIONS THROUGH A GROUP OF SERVERS IN A DATA CENTER

(71) Applicant: International Business Machines Corporation, Armonk, NY (US)

(72) Inventor: Jeffery L. Smith, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/838,941

(22) Filed: Aug. 28, 2015

(65) Prior Publication Data

US 2015/0372944 A1  Dec. 24, 2015

Related U.S. Application Data

(63) Continuation of application No. 14/175,037, filed on Feb. 7, 2014.

(51) Int. Cl.
*G06F 15/173* (2006.01)
*H04L 12/911* (2013.01)
(Continued)

(52) U.S. Cl.
CPC .............. *H04L 47/783* (2013.01); *H04L 47/70* (2013.01); *H04L 67/1002* (2013.01);
(Continued)

(58) Field of Classification Search
CPC ..... H04L 41/08; H04L 47/125; H04L 47/783; H04L 67/1002

USPC .................. 709/223–226, 201–203, 229; 718/104–105
See application file for complete search history.

(56) References Cited

U.S. PATENT DOCUMENTS 6,523,111 B1   2/2003   Smolski
7,051,103 B1   5/2006   Giroir et al.
(Continued)

FOREIGN PATENT DOCUMENTS

WO       0223875 A1      3/2002
WO       2013055601 A1   4/2013
WO       2013139037 A1   9/2013

OTHER PUBLICATIONS

Smith et al., "SNA Modernization Strategy for Access Node Connectivity," International Business Machines Corporation, ibm.com, Mar. 26, 2013, 18 pages.
(Continued)

*Primary Examiner* — Bharat N Barot
(74) *Attorney, Agent, or Firm* — Yee & Associates, P.C.; Joseph Petrokaitis

(57) ABSTRACT

Methods for managing communications between client computers and distributed resources. Distributed resources are identified that each of a set of client computers is configured to communicate with, based on configuration information stored on each of the set of client computers. A group of servers are configured to host communications between each of the set of client computers and the distributed resources, based on server capabilities of each server in the group of servers and a policy for load balancing communications through the group of servers. Then the configuration information stored on each of the set of client computers is modified to use the group of servers for communicating with the distributed resources.

8 Claims, 6 Drawing Sheets

(51) Int. Cl.
  *H04L 29/06* (2006.01)
  *H04L 29/08* (2006.01)
  *H04L 12/24* (2006.01)
  *H04L 12/803* (2013.01)

(52) U.S. Cl.
  CPC ........... *H04L 67/1008* (2013.01); *H04L 67/42* (2013.01); *H04L 41/08* (2013.01); *H04L 41/0813* (2013.01); *H04L 47/125* (2013.01); *H04L 67/18* (2013.01)

(56) References Cited

U.S. PATENT DOCUMENTS

| | | | |
|---|---|---|---|
| 7,068,680 B1* | 6/2006 | Kaltenmark | H04L 67/14 709/203 |
| 7,305,454 B2 | 12/2007 | Reese et al. | |
| 7,680,905 B1* | 3/2010 | Roberts | H04L 41/082 709/226 |
| 7,937,438 B1* | 5/2011 | Miller | H04L 41/12 709/224 |
| 8,352,953 B2 | 1/2013 | Bozek et al. | |
| 8,392,608 B1* | 3/2013 | Miller | H04L 41/12 709/223 |
| 8,468,535 B1 | 6/2013 | Keagy et al. | |
| 8,644,188 B1* | 2/2014 | Brandwine | H04L 41/0803 709/223 |
| 9,298,843 B1* | 3/2016 | Jenkins | H04L 67/04 |
| 2010/0306249 A1* | 12/2010 | Hill | G06F 17/30867 707/769 |
| 2013/0080636 A1* | 3/2013 | Friedman | H04L 41/08 709/225 |
| 2013/0091284 A1* | 4/2013 | Rothschild | H04L 67/10 709/226 |
| 2014/0365561 A1* | 12/2014 | Meyer | H04L 67/18 709/203 |
| 2015/0229578 A1* | 8/2015 | Smith | H04L 67/1002 709/226 |

OTHER PUBLICATIONS

Office Action, dated Jan. 15, 2016, regarding U.S. Appl. No. 14/175,037, 13 pages.
Notice of Allowance, dated Apr. 26, 2016, regarding U.S. Appl. No. 14/175,037, 8 pages.

* cited by examiner

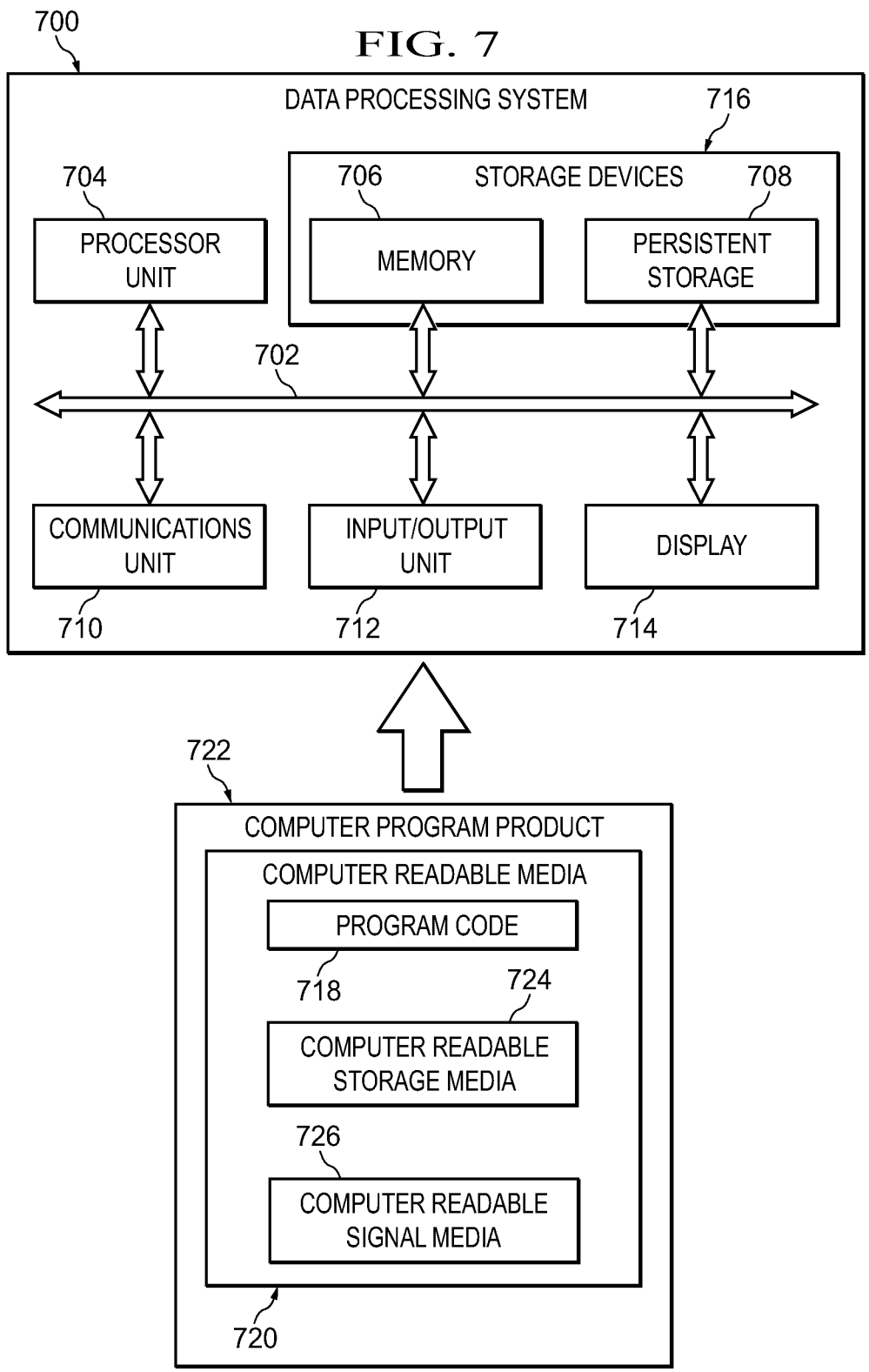

PROVISIONING LEGACY SYSTEMS NETWORK ARCHITECTURE RESOURCE COMMUNICATIONS THROUGH A GROUP OF SERVERS IN A DATA CENTER

This application is a continuation of application Ser. No. 14/175,037, filed Feb. 7, 2014, the entirety of which is hereby incorporated by reference herein.

BACKGROUND

1. Field

The disclosure relates generally to an improved data processing system, and, in particular, to a data processing system for managing communications between data processing systems. Still more particularly, the present disclosure relates to methods for provisioning communications between client computers and systems network architecture resources over a group of servers in a data center.

2. Description of the Related Art

Systems Network Architecture (SNA) based server applications are in use across many industries. These server applications typically run on back-end data processing systems. For example, Systems Network Architecture based financial applications are in use today executing and tracking financial transactions in back-end data processing systems. Because of the importance of business processes executing in Systems Network Architecture based server applications, these Systems Network Architecture based server applications are critical components of industry solutions.

Communicating with these server applications involves using Systems Network Architecture based communication protocols. Systems Network Architecture based client applications are configured to communicate with these server applications using the Systems Network Architecture based communication protocols. Systems Network Architecture based communication protocols are unique to Systems Network Architecture based solutions. Systems Network Architecture based protocols are not the same as internet protocols currently in use by web clients and web servers.

Therefore, it would be desirable to have a method, apparatus, and computer program product that takes into account at least some of the issues discussed above.

SUMMARY

In one illustrative embodiment, methods for managing communications between client computers and distributed resources are disclosed. An apparatus identifies distributed resources that each of a set of client computers is configured to communicate with based on configuration information stored on each of the set of client computers. The apparatus also configures a group of servers to host communications between each of the set of client computers and the distributed resources, based on server capabilities of each server in the group of servers and a policy for load balancing communications through the group of servers. The apparatus then modifies the configuration information stored on each of the set of client computers to use the group of servers for communicating with the distributed resources.

BRIEF DESCRIPTION OF THE SEVERAL VIEWS OF THE DRAWINGS

FIG. 7 is an illustration of a data processing system in accordance with an illustrative embodiment.

DETAILED DESCRIPTION

Figure 1:
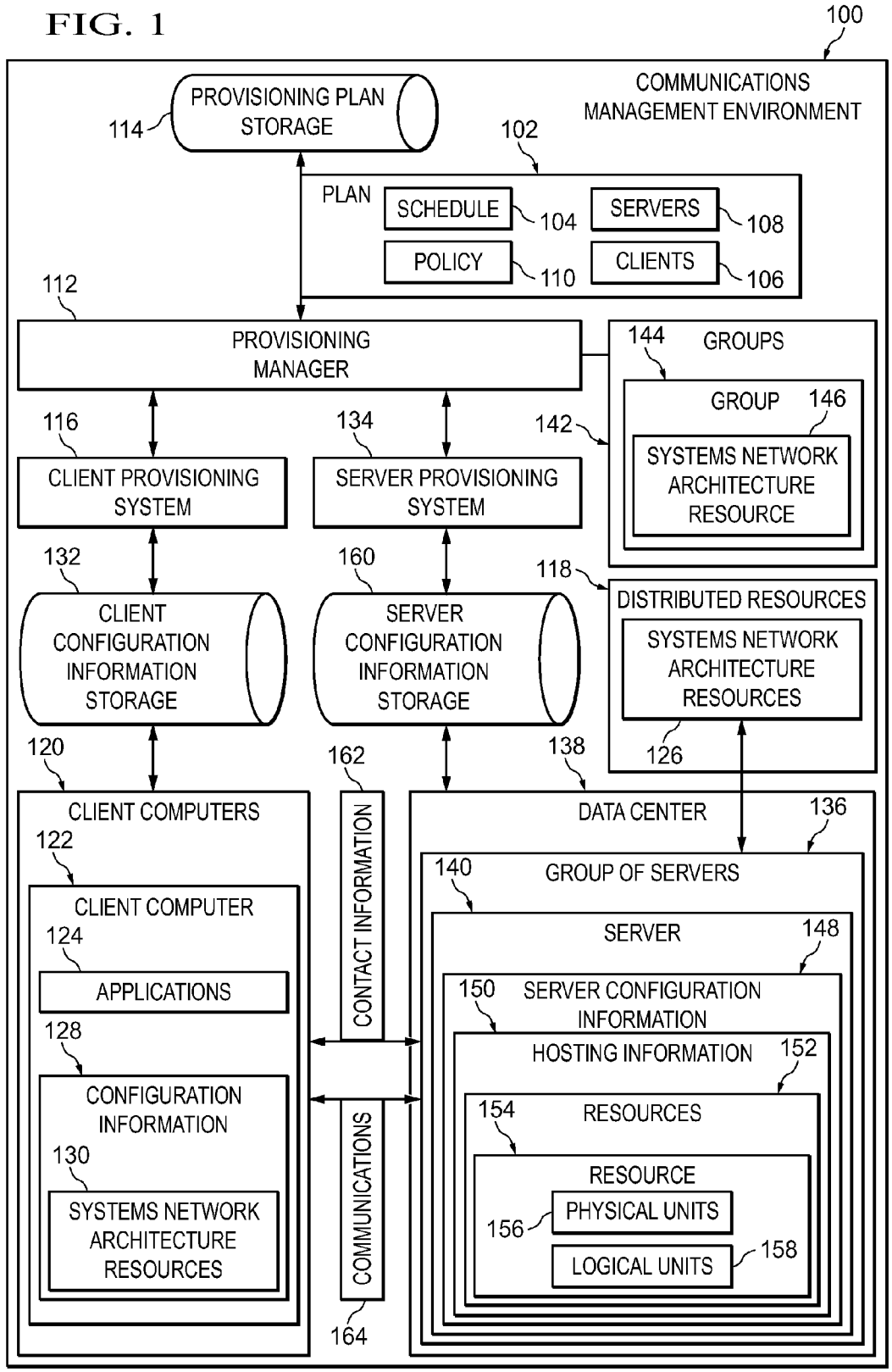
FIG. 1 is a block diagram of a data flow of a process for managing communications between client computers and distributed resources in a communications management environment in accordance with an illustrative embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like; conventional procedural programming languages, such as the "C" programming language or similar programming languages; scripting languages, such as Perl, JavaScript, Rexx, and PHP; and command line interface languages, such as batch and Bash. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The illustrative embodiments recognize and take into account a number of different considerations. For example, the illustrative embodiments recognize and take into account that existing data processing systems do not provide an ability to manage communications between client computers and distributed resources, using the steps of identifying distributed resources that each of a set of client computers is configured to communicate with, configuring a group of servers to host communications between each of the set of client computers and the distributed resources, and then modifying configuration information stored on each of the set of client computers to use the group of servers for communicating with the distributed resources. As an example, existing systems do not include an ability to use client computer configuration information, server capabilities of a group of servers, and a policy for load balancing communications through the group of servers to configure the group of servers to host communications between the client computers and distributed resources, and modify the configuration of the client computers to go through the group of servers to communicate with the distributed resources.

Thus, the illustrative embodiments provide a method, apparatus, and computer program product for managing communications between client computers and distributed resources. For example, a number of components of a communications management environment may manage communications between client computers and distributed resources. For example, a provisioning manager may use a client provisioning system to identify distributed resources that each of a set of client computers is configured to communicate with based on configuration information stored on each of the set of client computers. The provisioning manager may also use a server provisioning system to configure a group of servers to host communications between each of the set of client computers and the distributed resources, based on server capabilities of each server in the group of servers and a policy for load balancing communications through the group of servers. In this example, the provisioning manager may then use the client provisioning system to modify the configuration information stored on each of the set of client computers to use the group of servers for communicating with the distributed resources.

With reference now to FIG. 1, a block diagram of a data flow of a process for managing communications between client computers and distributed resources in a communications management environment is depicted in accordance with an illustrative embodiment. Communications management environment 100 is an illustrative example of an environment for implementing plan 102. In these illustrative examples, plans, such as plan 102, are instructions for modifying how client computers communicate with distributed resources.

In this illustrative example, plan 102 includes schedule 104 specifying when communications of clients 106 with distributed resources are to be modified. As depicted, plan 102 includes using servers 108 for communications between clients 106 and distributed resources according to schedule 104. In this illustrative example, plan 102 includes selecting servers 108 to use based on policy 110. In the illustrative example, policy 110 is one or more rules to determine which servers in servers 108 to use for clients 106. Policy 110 may also include data used to evaluate the rules. For example, policy 110 may include at least one of a rule for load balancing communications through groups of servers in servers 108; a rule for ensuring availability of communications through servers 108; a rule for minimizing overall distance of communications based on locations of servers 108, clients 106, and distributed resources stored in data in policy 110; and other suitable rules for managing communications between clients and servers in communications management environment 100. As an example, policy 110 may include a rule specifying how to create a group of servers from servers 108 for managing communications between clients 106 and distributed resources.

As used herein, the phrase "at least one of", when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A, one of item B, and ten of item C; four of item B and seven of item C; and other suitable combinations. The item may be a particular object, thing, or a category. In other words, at least one of means any combination of items and number of items may be used from the list but not all of the items in the list are required. As used herein, the phrase "a number of," when used with reference to items, means one or more items. For example, a "number of rules" is one or more rules.

As depicted, provisioning manager 112 processes plan 102, to implement plan 102 according to schedule 104. Provisioning manager 112 may retrieve plan 102 from provisioning plan storage 114. In these illustrative examples, provisioning plan storage 114 includes plans such as plan 102. For example, provisioning plan storage 114 may be implemented using a computer readable storage device. As another example, provisioning plan storage 114 may be at least one of an in memory buffer, a database or any other suitable storage for provisioning plan storage in communications management environment 100. For example, provisioning plan storage 114 may be a file in a computer readable storage device of a data processing system.

In the illustrated example, provisioning manager 112 uses client provisioning system 116 to identify configuration information about use of disturbed resources 118 by client computers 120. Client computers 120 may include at least one of personal computer systems, server computer systems, thin clients, thick clients, hand-held or laptop devices, multi-processor systems, microprocessor-based systems, set top boxes, programmable consumer electronics, network PCs, minicomputer systems, mainframe computer systems, and other computing environments that include any of the above systems or devices, and the like. Distributed resources 118 is at least one of an application, a set of processors, storage, a communication port, or other suitable types of resources in communications management environment 100. As used herein, the phrase "a set of," when used with reference to items, means a number of items.

In this illustrative example, client computer 122 is an example of a client computer in client computers 120. As depicted, client computer 122 includes applications 124 configured to use Systems Network Architecture resources 126 in distributed resources 118. Systems Network Architecture resources 126 are computing resources that use Systems Network Architecture protocol stacks for communications. In this illustrative example, configuration information 128 in client computer 122 includes Systems Network Architecture resources 130 as configuration information pointing to Systems Network Architecture resources 126.

As depicted, client provisioning system 116 may locate, store, and retrieve configuration information 128 using client configuration information storage 132. In these illustrative examples, client configuration information storage 132 includes configuration information such as configuration information 128. For example, client configuration information storage 132 may be implemented using a computer readable storage device. As another example, client configuration information storage 132 may be at least one of an in memory buffer, a database or any other suitable storage for client configuration information storage in communications management environment 100. For example, client configuration information storage 132 may be a file in a computer readable storage device of a data processing system.

In the illustrated example, provisioning manager 112 uses server provisioning system 134 to configure groups of servers 136 in data center 138 to manage communications between client computers 120 and distributed resources 118. Groups of servers 136 are groups of servers in data center 138. Server 140 is an example of a server in groups of servers 136.

As depicted, provisioning manager 112 determines groups 142 of servers based on policy 110. Group 144 in groups 142 is a group of servers generated by provisioning manger 112 based on policy 110. In this illustrative example, group 144 is group of servers 136 in data center 138.

In the illustrative example, server provisioning system 134 modifies server configuration information 148 to configure server 140 to manage communications between client computer 122 and systems network architecture resource 146. As depicted, hosting information 150 in server configuration information 148 specifies resources 152 for which communications are being hosted between client computer 122 and Systems Network Architecture resources 126. Resource 154 is an illustrative example of server configuration information for hosting communications between client computer 122 and system network architecture resource 146. As depicted, physical units 156 in resource 154 identify network nodes that support communication sessions between logical units. Logical units 158 in resource 154 are references pointing to Systems Network Architecture resources 126. In this illustrative example, after configuring server configuration information 148 logical units 158 may include a logical unit pointing to Systems Network Architecture resource 146.

As depicted, server provisioning system 134 may locate, store, and retrieve server configuration information 148 using server configuration information storage 160. In these illustrative examples, server configuration information storage 160 includes server configuration information such as server configuration information 148. For example, server configuration information storage 160 may be implemented using a computer readable storage device. As another example, server configuration information storage 160 may be at least one of an in memory buffer, a database or any other suitable storage for server configuration information storage in communications management environment 100. For example, server configuration information storage 160 may be a file in a computer readable storage device of a data processing system.

In this illustrative example, at least one server in group of servers 136 sends contact information 162 to client computers in client computers 120 to modify configuration information 128 stored in client computers 120. In the illustrative example, after modifying configuration information 128 with contact information 162, applications 124 use contact information 162 in communications 164 with server 140 to reach Systems Network Architecture resource 146. In this illustrative example, client computers 120 and group of servers 136 may use internet protocols for communications 164.

The illustration of communications management environment 100 in FIG. 1 is not meant to imply physical or architectural limitations to the manner in which different illustrative embodiments may be implemented. Other components in addition to and/or in place of the ones illustrated may be used. Some components may be unnecessary. Also, the blocks are presented to illustrate some functional components. One or more of these blocks may be combined and/or divided into different blocks when implemented in an illustrative embodiment.

In some illustrative examples, additional groups of servers in addition to group of servers 136 in data center 138 may be present within communications management environment 100. For example, another group of servers other than group of servers 136 may be located in another data center other than data center 138. In this example, provisioning manager may determine which group of servers to host communications for system network architecture resource 146 based on a rule in policy 110. As an example, the rule may be based the location of the data center and location of client computer 122. In this example, the rule may be for minimizing the overall distance traveled by all communications between client computers 120 and distributed resources 118.

Also, although components of communications management environment 100 are shown as separate blocks in communications management environment 100, all or a portion of these may also be implemented in client computers 120, group of servers 136, or other suitable components in communications management environment 100. In these illustrative examples, communications management environment 100 may be implemented by any combination of hardware and software products, and may also be implemented in one or more computer systems or a cluster of computer systems.

Figure 2:
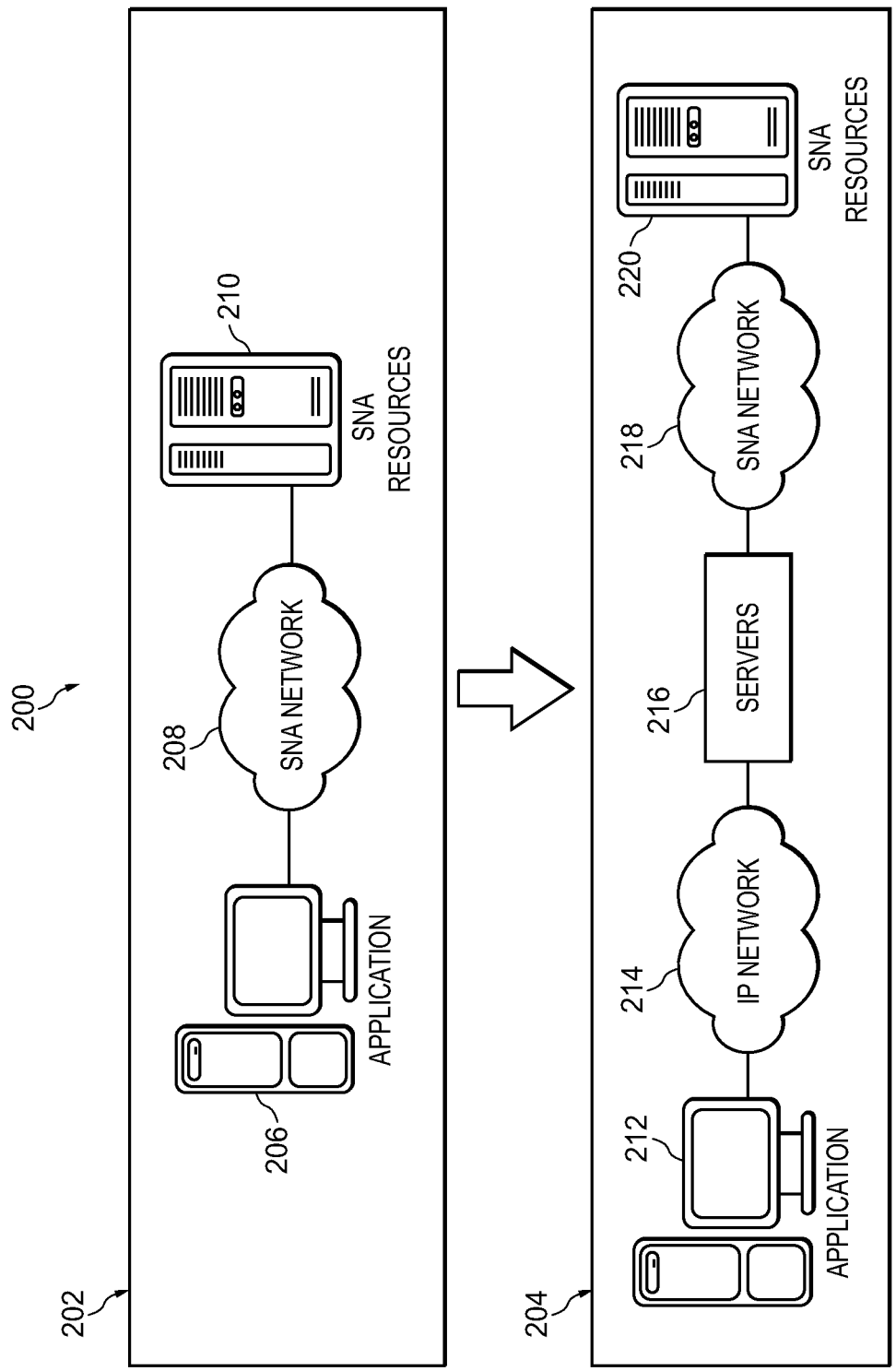
FIG. 2 is a flowchart of a process for modifying how client applications communicate with distributed resources in accordance with an illustrative embodiment.

With reference next to FIG. 2, an illustration of a flowchart of a process for modifying how client applications communicate with distributed resources is depicted in accordance with an illustrative embodiment. Process 200 illustrated in FIG. 2 may be implemented in communications management environment 100 in FIG. 1 using provisioning manager 112, client provisioning system 116, and server provisioning system 134 in FIG. 1.

In this illustrative example, process 200 shows an example of initial configuration 202 of communications management environment 100 and subsequent configuration 204 of communications management environment 100. As depicted, initial configuration 202 comprises application 206 communicating with Systems Network Architecture resources 210 over Systems Network Architecture network 208. As also depicted, subsequent configuration 204 has application 212 communicating over internet protocol network 214 with servers 216 which in turn communicate over Systems Network Architecture network 208 with Systems Network Architecture resources 220. For example, plan 102 in FIG. 1 may be to modify communications management environment 100 from initial configuration 202 to subsequent configuration 204.

In this illustrative example, application 212 is an example of application 206 modified to send communications to servers 216 over internet protocol network 214 in lieu of sending communications to Systems Network Architecture resources 210 over Systems Network Architecture network 208 as was done in configuration 202. Application 206 and application 212 are examples of an application in applications 124 in client computer 122 in FIG. 1. Servers 216 is an example of group of servers 136 in data center 138 in FIG. 1 and Network Architecture resources 210 and Systems Network Architecture resources 220 are examples of Systems Network Architecture resources 126 in FIG. 1. In this illustrative example, Systems Network Architecture network 218 is an example of Systems Network Architecture network 208 where communications that were with application 206 in configuration 202 are now with servers 216 in configuration 204.

Figure 3:
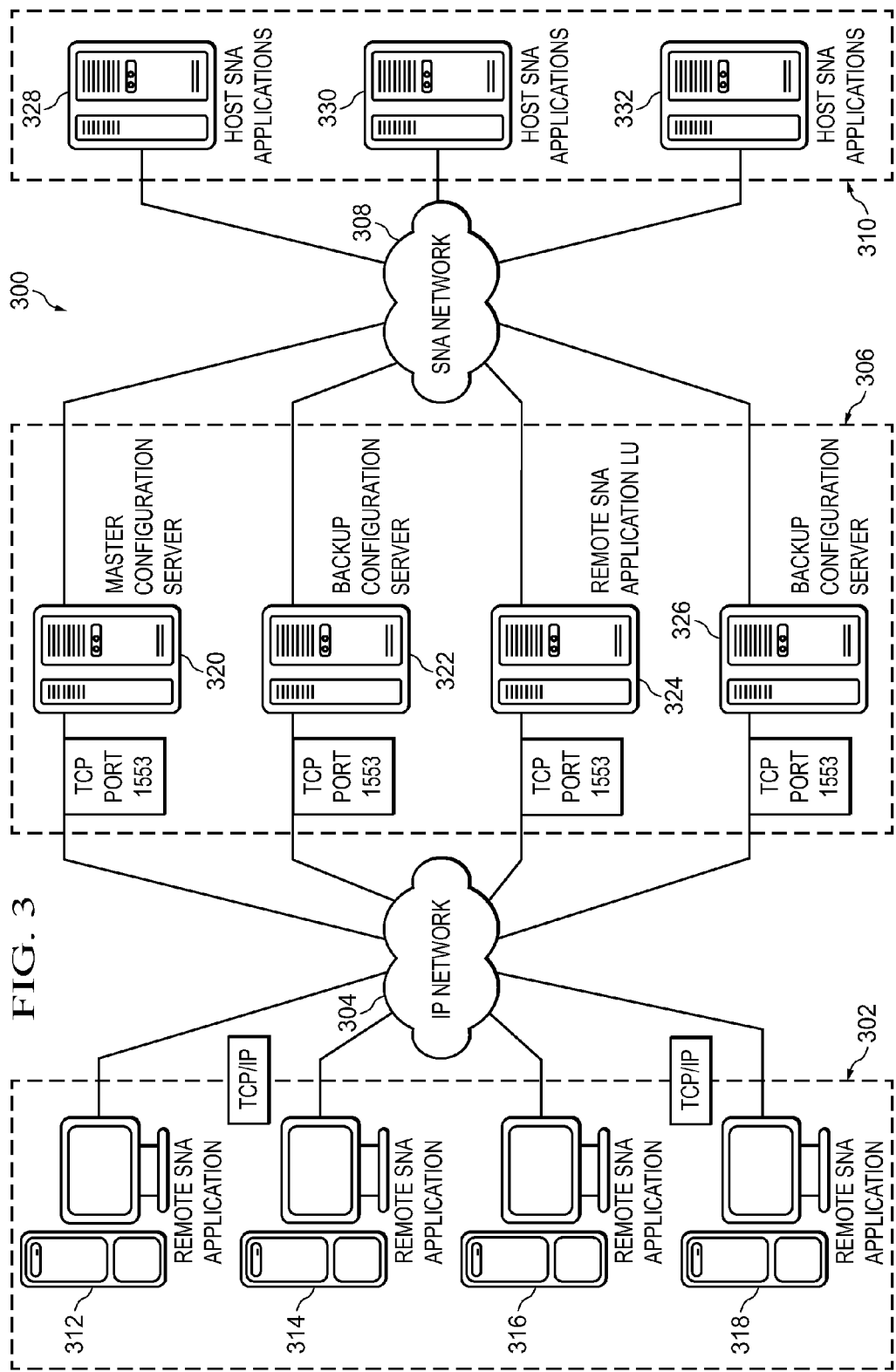
FIG. 3 is a flowchart of a process for managing communications between client computers and distributed resources in accordance with an illustrative embodiment.

Turning now to FIG. 3, an illustration of a flowchart of a process for managing communications between client computers and distributed resources is depicted in accordance with an illustrative embodiment. Process 300 illustrated in FIG. 3 may be implemented in communications management environment 100 in FIG. 1 using client computers 120, group of servers 136, and Systems Network Architecture resources 126 in FIG. 1.

In this illustrative example, process 300 shows an example of subsequent configuration 204 in FIG. 2 of communications management environment 100. In this illustrated example, client computers 302 communicating over internet protocol network 304 to group of servers 306 is an example of client computers 120 communicating in FIG. 1 with group of servers 136. Group of servers 306 communicating over Systems Network Architecture network 308 with Systems Network Architecture resources 310 is an example of group of servers 136 communicating with Systems Network Architecture resources 126.

As depicted, client computer 312, client computer 314, client computer 316, and client computer 318 in client computers 302 each include a remote Systems Network Architecture application that communicates with host Systems Network Architecture applications running on Systems Network Architecture resource 328, Systems Network Architecture resource 330, and Systems Network Architecture resource 332 in Systems Network Architecture resources 310. In this illustrative example, the communications between the remote Systems Network Architecture application in client computers 302 and host Systems Network Architecture applications in Systems Network Architecture resources 310 are implemented using transmission control protocol/internet protocol (TCP/IP) messages over internet protocol network 304 to group of servers 306. As depicted, the transmission control protocol/internet protocol messages are received by group of servers 306 using transmission control protocol port number 1553 in each server in group of servers 306. The received messages are then routed by group of servers 306 to Systems Network Architecture resources 310 over Systems Network Architecture network 308.

In the illustrative example, server 320 in group of servers 306 is configured as a master configuration server for group of servers 306. As used herein, when a particular server of a group of servers is configured as the master configuration server, the particular server performs the function of maintaining an internal data store about all resources being managed by the group of servers.

As depicted, server 322 and server 326 are configured as backup configuration servers in group of servers 306. As used herein, when a particular server of a group of servers is configured as a backup configuration server, the particular server performs the function of maintaining a backup of the internal data store stored in the master server for taking over the master server in the event the master server fails.

In the illustrative example, server 324 in group of servers 306 is shown managing a remote Systems Network Architecture application logical unit that points to one of the resources in Systems Network Architecture resources 310. For example, the remote Systems Network Architecture application logical unit may be in use by a remote Systems Network Architecture application in client computers 302.

Figure 4:
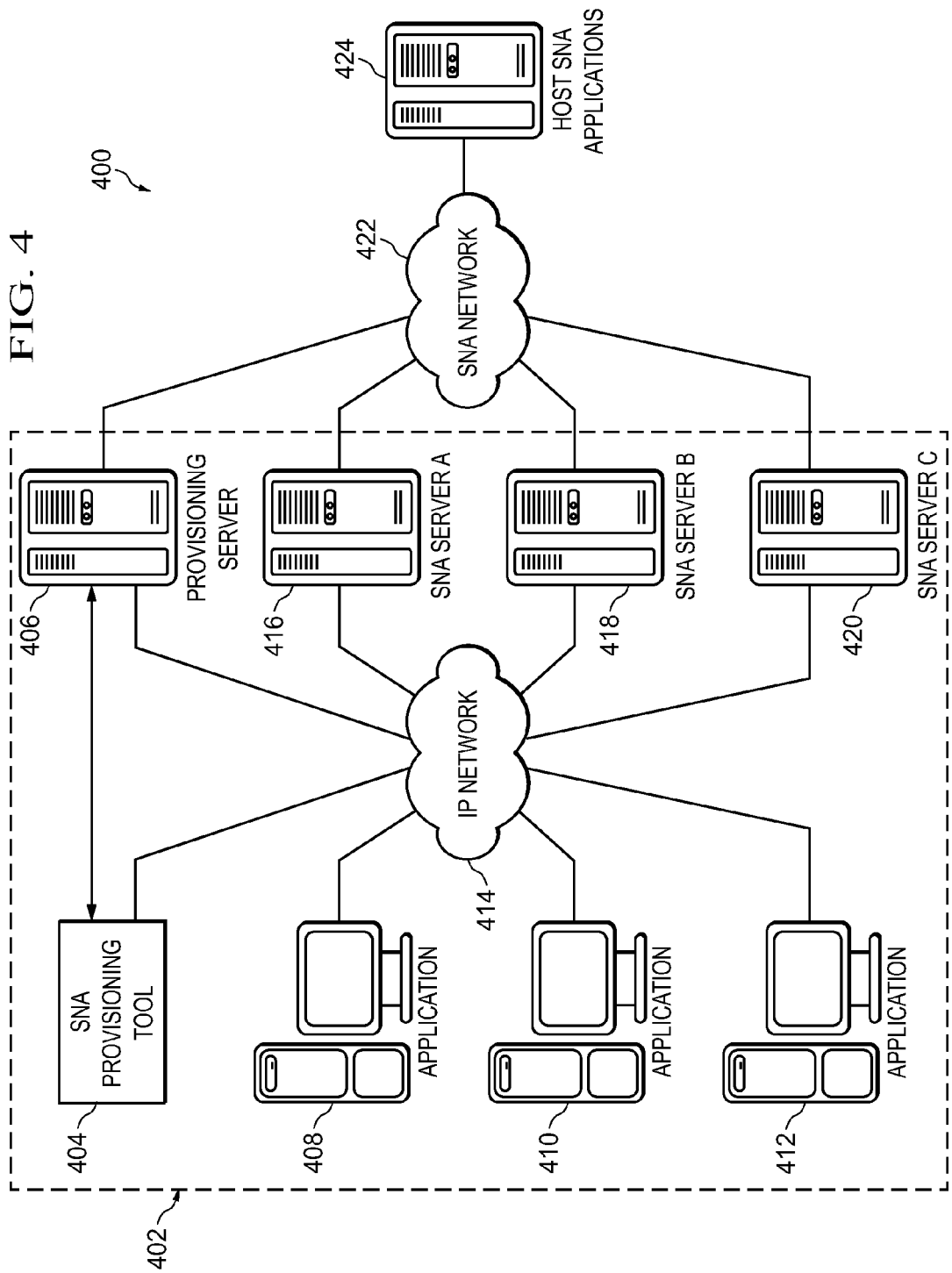
FIG. 4 is a flowchart of a process for provisioning communications between clients and distributed resources over servers in accordance with an illustrative embodiment.

Turning next to FIG. 4, an illustration of a flowchart of a process for provisioning communications between client computers and distributed resources is depicted in accordance with an illustrative embodiment. Process 400 illustrated in FIG. 4 may be implemented in communications management environment 100 in FIG. 1 using provisioning manager 112, client provisioning system 116, and server provisioning system 134 in FIG. 1.

In this illustrative example, process 400 shows an example of a process for provisioning data processing systems in data center 402. As depicted, data center 402 is an example of data center 138 in FIG. 1. Systems Network Architecture provisioning tool 404 is an example of provisioning manager 112 and provisioning server 406 is an example of server provisioning system 134. In the illustrated example, Systems Network Architecture provisioning tool 404 configures application 408, application 410, and application 412 to communicate over internet protocol network 414 with server 416 identified uniquely as SNA Server A, server 418 identified uniquely as SNA Server B, and server 420 identified uniquely as SNA Server C. For example, Systems Network Architecture provisioning tool 404 may communicate with application 408, application 410, and application 412 over internet protocol network 414 to modify configuration information for application 408, application 410, and application 412 stored in data center 402. Application 408, application 410, and application 412 are examples of applications 124 in client computers 120 in FIG. 1 and server 416, server 418, and server 420 is an example of group of servers 136 in FIG. 1.

As depicted, provisioning server 406 configures server 416, server 418, and server 420 to communicate over Systems Network Architecture network 422 with host Systems Network Architecture applications 424. For example, provisioning server 406 may communicate with server 416, server 418, and server 420 over internet protocol network 414 to modify configuration information for server 416, server 418, and server 420 stored in data center 402.

Figure 5:
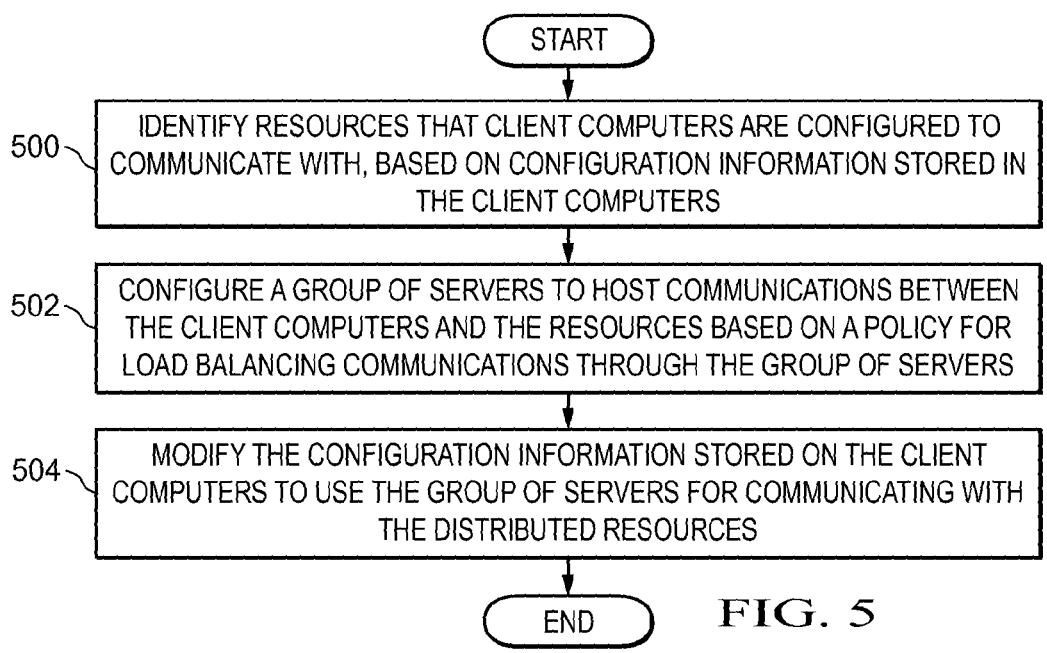
FIG. 5 is a flowchart of a process for managing communications between client computers and distributed resources in accordance with an illustrative embodiment.

With reference next to FIG. 5, an illustration of a flowchart of a process for managing communications between client computers and distributed resources is depicted in accordance with an illustrative embodiment. The steps illustrated in FIG. 5 are examples of steps that may be used to process plan 102 in FIG. 1 for managing communications 164 between client computers 120 and distributed resources 118 over group of servers 136. These steps may be implemented in provisioning manager 112 in FIG. 1, client provisioning system 116 in FIG. 1, server provisioning system 134 in FIG. 1 and in other data processing systems in FIG. 1.

The process begins by identifying resources that client computers are configured to communicate with, based on configuration information stored in the client computers (step 500). The configuration information in step 500 is an example of configuration information 128 in FIG. 1.

The process also configures a group of servers to host communications between the client computers and the resources based on a policy for load balancing communications through the group of servers (step 502). The policy in step 502 is an example of policy 110 in FIG. 1. As depicted, the process may then modify the configuration information stored on the client computers to use the group of servers for communicating with the distributed resources (step 504), with the process terminating thereafter.

The processing performed in steps 500 and 504 may be performed by provisioning manager 112, client provisioning system 116, client computers 120, and other suitable data processing systems in communications management environment 100. The processing performed in step 502 may be performed by provisioning manager 112, server provisioning system 134, group of servers 136, and other suitable data processing systems in communications management environment 100.

The process in FIG. 5 may be repeated any number of times to process based on schedule 104 in FIG. 1. For example, schedule 104 may include options for migrating communications between sets of client computers in client computers 120 and sets of distributed resources in distributed resources 118 at different times. In this example, the process may be repeated until all communications between client computers 120 and distributed resources 118 have been modified to go over groups of servers 136 in data center 138.

Additionally, the process may be repeated responsive to determination of a change to one or more of policy 110, distributed resources 118, client computers 120, and group of servers 136. For example, the steps may be repeated responsive to provisioning manager 112 determining that a change occurred to at least one of policy 110, availability of distributed resources 118, availability of group of servers 136, a change to how many client computers are in client computers 120, or other suitable type of changes.

Figure 6:
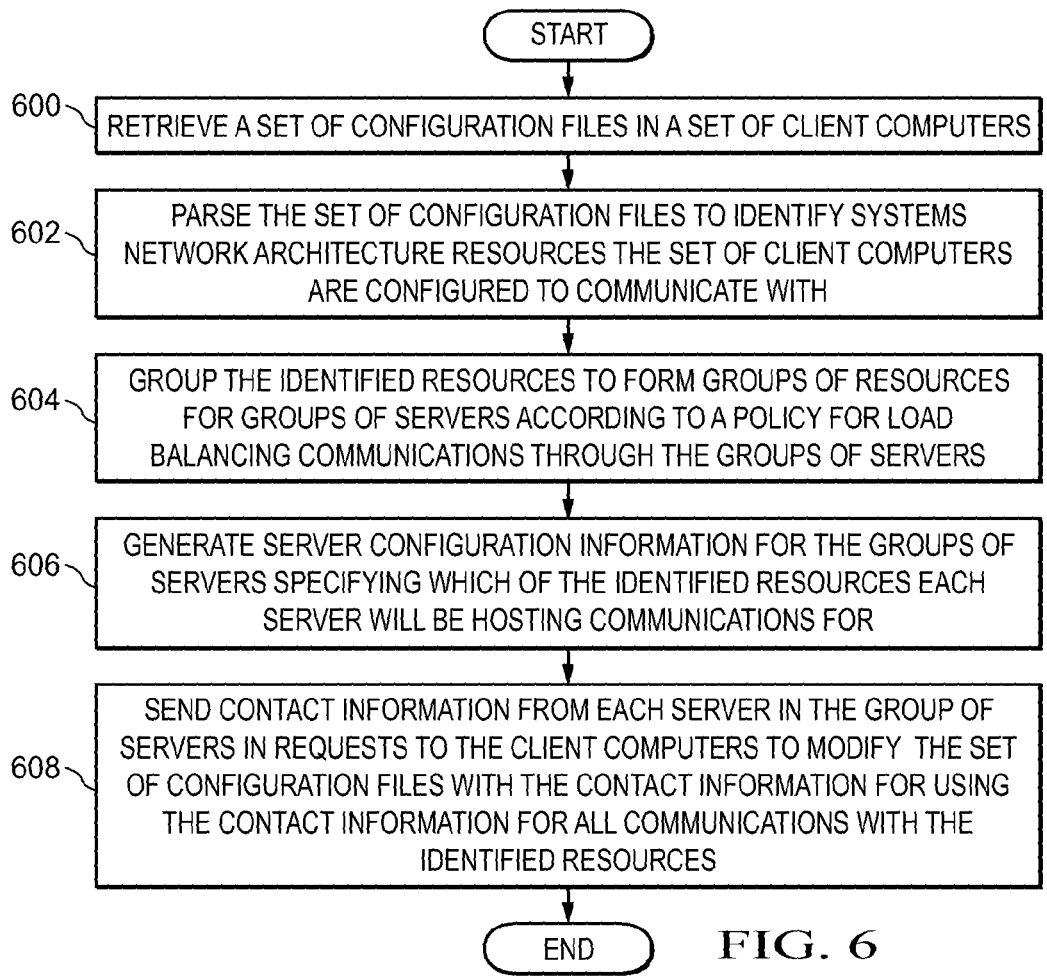
FIG. 6 is a flowchart of a process for provisioning communications between client computers and Systems Network Architecture based resources over a group of servers in accordance with an illustrative embodiment.

With reference next to FIG. 6, an illustration of a flowchart of a process for provisioning communications between client computers and Systems Network Architecture based resources over a group of servers is depicted in accordance with an illustrative embodiment. The steps illustrated in FIG. 6 are examples of steps that may be used to process plan 102 in FIG. 1 for managing communications 164 between client computers 120 and Systems Network Architecture resources 126 over group of servers 136. These steps may be implemented in provisioning manager 112 in FIG. 1, client provisioning system 116 in FIG. 1, server provisioning system 134 in FIG. 1 and in other data processing systems in FIG. 1.

The process begins by retrieving a set of configuration files in a set of client computers (step 600). The set of configuration files in step 600 is an example of configuration information 128 in FIG. 1. The process also parses the set of configuration files to identify Systems Network Architecture resources the set of client computers are configured to communicate with (step 602).

As depicted, the process groups the identified resources to form groups of resources for groups of servers according to a policy for load balancing communications through the groups of servers (step 604). The policy in step 604 is an example of policy 110 in FIG. 1.

Next the process generates server configuration information for the groups of servers specifying which of the identified resources each server will be hosting communications for (step 606). As depicted, the steps of the process then include sending contact information from each server in the group of servers in requests to the client computers to modify the set of configuration files with the contact information for using the contact information for all communications with the identified resources (step 608), with the process terminating thereafter.

The processing performed in steps 600 and 602 may be performed by provisioning manager 112, client provisioning system 116, client computers 120, and other suitable data processing systems in communications management environment 100. The processing performed in steps 604, 606, and 608 may be performed by provisioning manager 112, server provisioning system 134, group of servers 136, and other suitable data processing systems in communications management environment 100.

The steps described in the process in FIG. 6 are not meant to limit the number of different ways the process may be performed. For example, in step 608 instead of each server in the group of servers sending the contact information for the communications they are hosting communications for, any one or more of the servers may send the contact information for the other servers. In this example, a first server may send contact information for a second server to a client computer to use the second server for communications with a particular Systems Network Architecture resource.

Turning now to FIG. 7, an illustration of a data processing system is depicted in accordance with an illustrative embodiment. Data processing system 700 is an example of a data processing system that may be used to implement managing application patterns in an application pattern management environment. Data processing system 700 is also an example of a data processing system that may be used to implement clients in client computers 120, servers in group of servers 136, and resources in distributed resources 118 in FIG. 1. Data processing system 700 may be used to implement provisioning plan storage 114, client configuration information storage 132, and server configuration information storage 160 in FIG. 1. More particularly, data processing system 700 may be used to implement provisioning manager 112, client provisioning system 116, and server provisioning system 134 in FIG. 1.

In this illustrative example, data processing system 700 includes communications framework 702, which provides communications between processor unit 704, memory 706, persistent storage 708, communications unit 710, input/output (I/O) unit 712, and display 714. In these examples, communications frame work 702 may be a bus system.

Processor unit 704 serves to execute instructions for software that may be loaded into memory 706. Processor unit 704 may be a number of processors, a multiprocessor core, or some other type of processor, depending on the particular implementation. A number, as used herein with reference to an item, means one or more items. Further, processor unit 704 may be implemented using a number of heterogeneous processor systems in which a main processor is present with secondary processors on a single chip. As another illustrative example, processor unit 704 may be a symmetric multiprocessor system containing multiple processors of the same type.

Memory 706 and persistent storage 708 are examples of storage devices 716. A storage device is any piece of hardware that is capable of storing information, such as, for example, without limitation, data, program code in functional form, and/or other suitable information either on a temporary basis and/or a permanent basis. Storage devices 716 may also be referred to as computer readable storage devices in these examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these examples, provides for communications with other data processing systems or devices. In these examples, communications unit 710 is a network interface card. Communications unit 710 may provide communications through the use of either or both physical and wireless communications links.

Input/output unit 712 allows for input and output of data with other devices that may be connected to data processing system 700. For example, input/output unit 712 may provide a connection for user input through a keyboard, a mouse, and/or some other suitable input device. Further, input/output unit 712 may send output to a printer. Display 714 provides a mechanism to display information to a user.

Instructions for the operating system, applications, and/or programs may be located in storage devices 716, which are in communication with processor unit 704 through communications framework 702. In these illustrative examples, the instructions are in a functional form on persistent storage 708. These instructions may be loaded into memory 706 for execution by processor unit 704. The processes of the different embodiments may be performed by processor unit 704 using computer implemented instructions, which may be located in a memory, such as memory 706.

These instructions are referred to as program code, computer usable program code, or computer readable program code that may be read and executed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transferred to data processing system 700 for execution by processor unit 704. Program code 718 and computer readable media 720 form computer program product 722 in these examples. In one example, computer readable media 720 may be computer readable storage media 724 or computer readable signal media 726. Computer readable storage media 724 may include, for example, an optical or magnetic disk that is inserted or placed into a drive or other device that is part of persistent storage 708 for transfer onto a storage device, such as a hard drive, that is part of persistent storage 708. Computer readable storage media 724 also may take the form of a persistent storage, such as a hard drive, a thumb drive, or a flash memory, that is connected to data processing system 700. In some instances, computer readable storage media 724 may not be removable from data processing system 700. In these examples, computer readable storage media 724 is a physical or tangible storage device used to store program code 718 rather than a medium that propagates or transmits program code 718. Computer readable storage media 724 is also referred to as a computer readable tangible storage device or a computer readable physical storage device. In other words, computer readable storage media 724 is a media that can be touched by a person.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 718 may be downloaded over a network to persistent storage 708 from another device or data processing system through computer readable signal media 726 for use within data processing system 700. For instance, program code stored in a computer readable storage medium in a server data processing system may be downloaded over a network from the server to data processing system 700. The data processing system providing program code 718 may be a server computer, a client computer, or some other device capable of storing and transmitting program code 718.

The different components illustrated for data processing system 700 are not meant to provide architectural limitations to the manner in which different embodiments may be implemented. The different illustrative embodiments may be implemented in a data processing system including components in addition to or in place of those illustrated for data processing system 700. Other components shown in FIG. 7 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 704 may take the form of a hardware unit that has circuits that are manufactured or configured for a particular use. This type of hardware may perform operations without needing program code to be loaded into a memory from a storage device to be configured to perform the operations. For example, when processor unit 704 takes the form of a hardware unit, processor unit 704 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a field programmable logic array, a field programmable gate array, and other suitable hardware devices. With this type of implementation, program code 718 may be omitted because the processes for the different embodiments are implemented in a hardware unit.

In still another illustrative example, processor unit 704 may be implemented using a combination of processors found in computers and hardware units. Processor unit 704 may have a number of hardware units and a number of processors that are configured to run program code 718. With this depicted example, some of the processes may be implemented in the number of hardware units, while other processes may be implemented in the number of processors.

In another example, a bus system may be used to implement communications framework 702 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of more devices that transmit data, receive data, or transmit and receive data. A communications unit may be, for example, a modem or a network adapter, two network adapters, or some combination thereof. Further, a memory may be, for example, memory 706, or a cache, such as found in an interface and memory controller hub that may be present in communications framework 702.

Thus, the illustrative embodiments provide a method, apparatus, and computer program product for managing communications between client computers and distributed resources. In some examples, a program identifies distributed resources that each of a set of client computers is configured to communicate with based on configuration information stored on each of the set of client computers. In these examples, the program configures a group of servers to host communications between each of the set of client computers and the distributed resources, based on server capabilities of each server in the group of servers and a policy for load balancing communications through the group of servers. The program then modifies the configuration information stored on each of the set of client computers to use the group of servers for communicating with the distributed resources, in these examples.

By automatically provisioning a group of servers for managing communications between client computers and distributed resources, and also automatically provisioning the client computers to use the group of servers in all communications between the client computers and the distributed resources, migrations of existing communications between client computers and distributed resources can be done more efficiently and with less human error.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for managing communications between client computers and systems network architecture resources, the method comprising:
   identifying, by a group of processors, the systems network architecture resources that each of a set of client computers communicates with based on configuration information stored on each of the set of client computers regarding use of the systems network architecture resources by each of the set of client computers;
   configuring, by the group of processors, a group of servers to host communications between each of the set of client computers and the systems network architecture resources based on a schedule to migrate the communications between each of the set of client computers and the systems network architecture resources at different times, wherein the set of client computers communicate with the group of servers via an internet protocol and the systems network architecture resources communicate with the group of servers via a systems network architecture protocol; and modifying, by the group of processors, the configuration information stored on each of the set of client computers to use the group of servers for communicating with the systems network architecture resources.

2. The method of claim 1, wherein the configuring, by the group of processors, the group of servers to host the communications between each of the set of client computers and the systems network architecture resources further comprises:

grouping the systems network architecture resources to form one or more groups of the distributed systems network architecture resources for each server in the group of servers according to a policy for load balancing communications through the group of servers; and generating server configuration information for each server in the group of servers specifying the one or more groups of the systems network architecture resources that each server is hosting.

3. The method of claim 2, wherein the modifying, by the group of processors, the configuration information stored on each of the set of client computers to use the group of servers for communicating with the systems network architecture resources further comprises:

sending contact information to a group of client computers in the set of client computers from a portion of the group of servers to modify the configuration information stored on the group of client computers regarding use of the systems network architecture resources by each of the group of client computers.

4. The method of claim 1, wherein the systems network architecture resources are communications resources, and wherein the configuring, by the group of processors, the group of servers to host the communications between each of the set of client computers and the systems network architecture resources further comprises:

defining physical units for hosting the communications between each of the set of client computers and the systems network architecture resources; and defining logical units for pointing to the systems network architecture resources.

5. The method of claim 1, wherein the identifying, by the group of processors, the systems network architecture resources that each of the set of client computers communicates with further comprises:

retrieving a set of configuration files stored in the set of clients; and parsing the set of configuration files for systems network architecture configuration information identifying the systems network architecture resources that each of the set of client computers communicates with.

6. The method of claim 1, wherein each of the systems network architecture resources is one or more of an application, a set of processors, a storage, and a communication port.

7. The method of claim 1, wherein the group of servers is located in a data center.

8. The method of claim 1, wherein the configuration information is for applications running on the set of clients, and wherein the communications are between the applications running on the set of clients and the systems network architecture resources.

* * * * *